May 12, 1931. G. NAISMITH ET AL 1,805,001
FURNACE
Filed Dec. 9, 1929 5 Sheets-Sheet 1

FIGURE I

INVENTORS

May 12, 1931.  G. NAISMITH ET AL  1,805,001
FURNACE
Filed Dec. 9, 1929  5 Sheets-Sheet 3

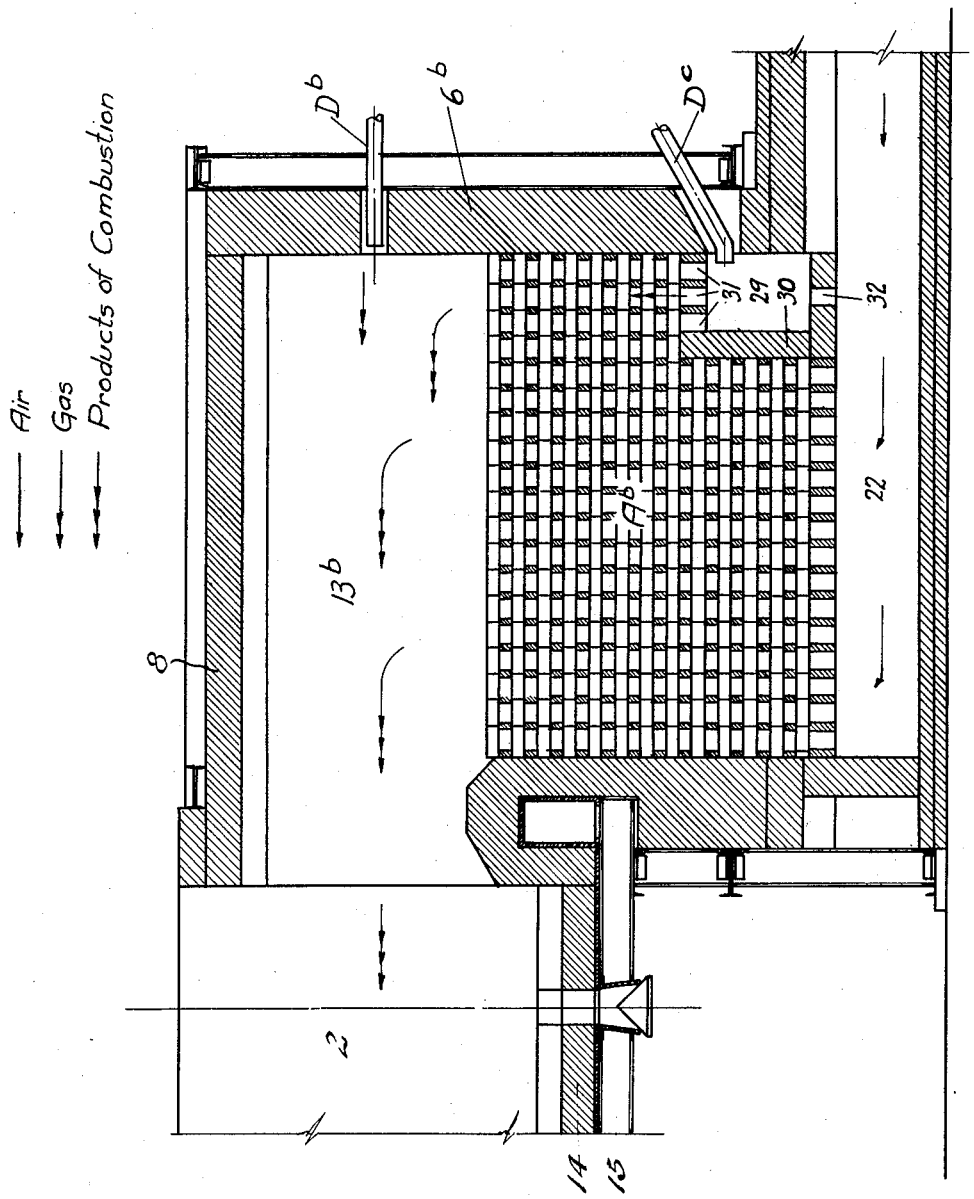

Patented May 12, 1931

1,805,001

UNITED STATES PATENT OFFICE

GEORGE NAISMITH AND DONALD M. NAISMITH, OF PITTSBURGH, PENNSYLVANIA, ASSIGNORS TO DONALD M. NAISMITH

FURNACE

Application filed December 9, 1929. Serial No. 412,738.

Our invention is an improvement in heating furnaces of the regenerative type, particularly adapted to the heating of ingots and the like within a soaking pit or chamber. It has in view to provide a regenerative furnace construction in which the incoming air first passes through a preheating checkerwork arranged below a mixture and combustion chamber for combination with directly introduced fuel gases, with circulation through the furnace and return of the gases of combustion through corresponding checkerwork at the other side of a partition wall, with circulating ports, reversing valves, etc., as shall be more fully hereinafter described.

The present construction is particularly designed for the purpose of providing an enlarged mixing and combustion chamber for the pre-heated air and gases, prior to their introduction into the soaking pit, for extended preliminary travel and mixture, for the best results. The construction is particularly designed for use in connection with blast furnace or other gases having a low heat value and requiring an abnormal fuel volume, compared to ordinary producer gas, and thereby making it necessary to provide enlarged combustion chamber values prior to admission of burning gases to the soaking pit proper.

This result is accomplished by embodiment in the lower portion of the furnace construction of pre-heating checkerwork with ample area for complete pre-heating of the incoming air with direct delivery to an enlarged upper mixture and combustion chamber, into which the fuel gases are admitted directly.

An alternative construction, hereinafter described, provides for pre-heating of a portion of the combustion gases by circulation therethrough of a portion only of the air pre-heating checkerwork and control of the gas circulation.

Generally stated, the heating chamber or soaking pit receives the incoming fuel gas and air in combustion at one side and discharges the waste gases at the other side of the furnace chamber, through which the gases circulate in an approximately horizontal annular or horseshoe-shaped path, alternating with each reversal of the valves whereby the ingots etc. are exposed to the heating action at all times.

The present improvement is otherwise generally similar to that of prior Patent No. 1,727,898.

In the drawings showing one preferred embodiment of the invention:

Fig. 5 is a partial longitudinal vertical section similar to Fig. 1, showing a modified construction providing an elongated mixing and combustion chamber with partial pre-heating of the fuel gases.

Figure 1:
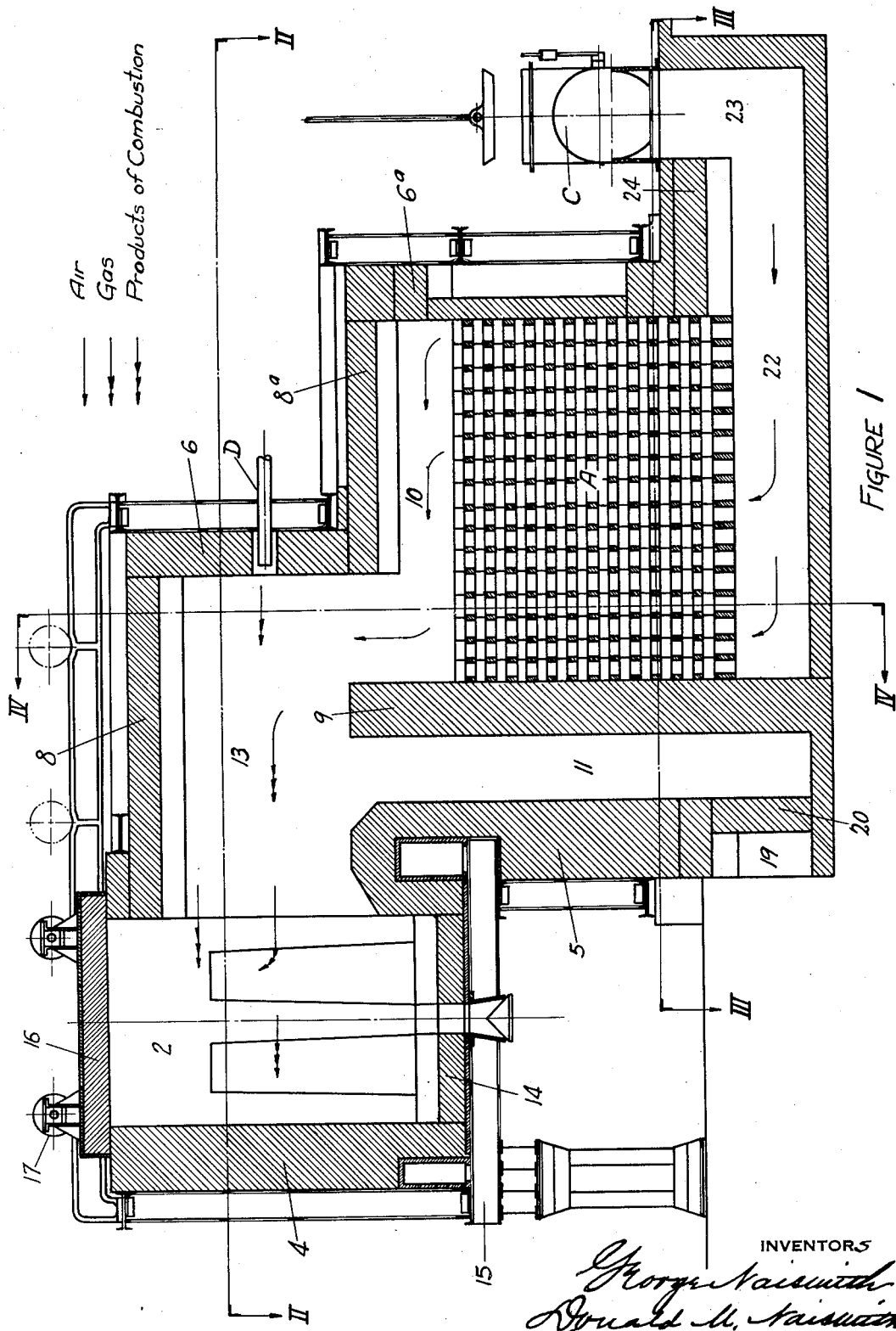
Fig. 1 is a longitudinal vertical section through the furnace on the line I—I of Fig. 2.

The soaking pit or heating chamber 2 of the furnace is of generally rectangular construction within side walls 3—3, outer end wall 4 and inner transverse partition 5. The latter forms a partial closure of the heating chamber, forming the end wall of the regenerative portion of the furnace, which is also enclosed between the main side walls 3 and the opposite end wall 6.

A central partition wall 7 extends vertically from the base of the construction upwardly to the roof, forming a support for the arched roof coverings 8—8 of the air regenerative chambers A and the common mixing and combustion chamber 13. These roof arches extend longitudinally from partition 5 to end wall 6.

As shown in Fig. 1, end wall 6 is set inwardly beyond a lower outermost end wall 6a and connected therewith by a covering roof 8a, enclosing the amply large regenerative checkerwork chamber A. One such chamber is arranged at each opposite side of partition 7, of equal size, between the main end wall 6a and an opposite inner wall 9.

Wall 9 extends from the base upwardly above the top of the checkerwork leaving an intervening space 10 for circulation of gases either from or to the checkerwork below the roof arches 8 and 8a. Between walls 5 and 9 is a vertical well 11 for collection of any slag or other accumulation, removable through an opening 19 having a suitable removable cover or door 20.

Figure 2:
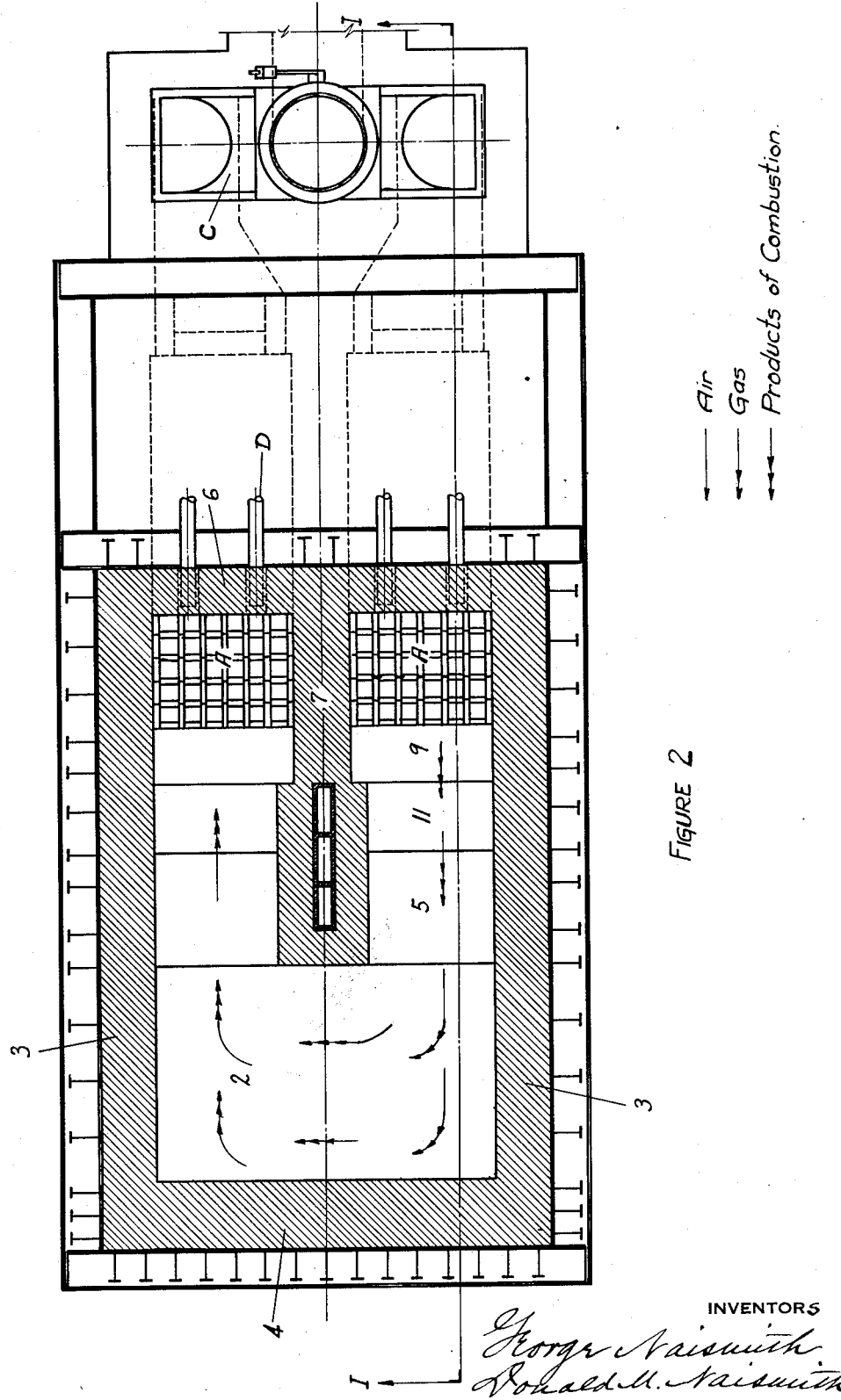
Fig. 2 is a horizontal section, part plan view, on the section line II—II of Fig. 1, showing the air pre-heating checkerwork in plan and section respectively.
Figure 3:
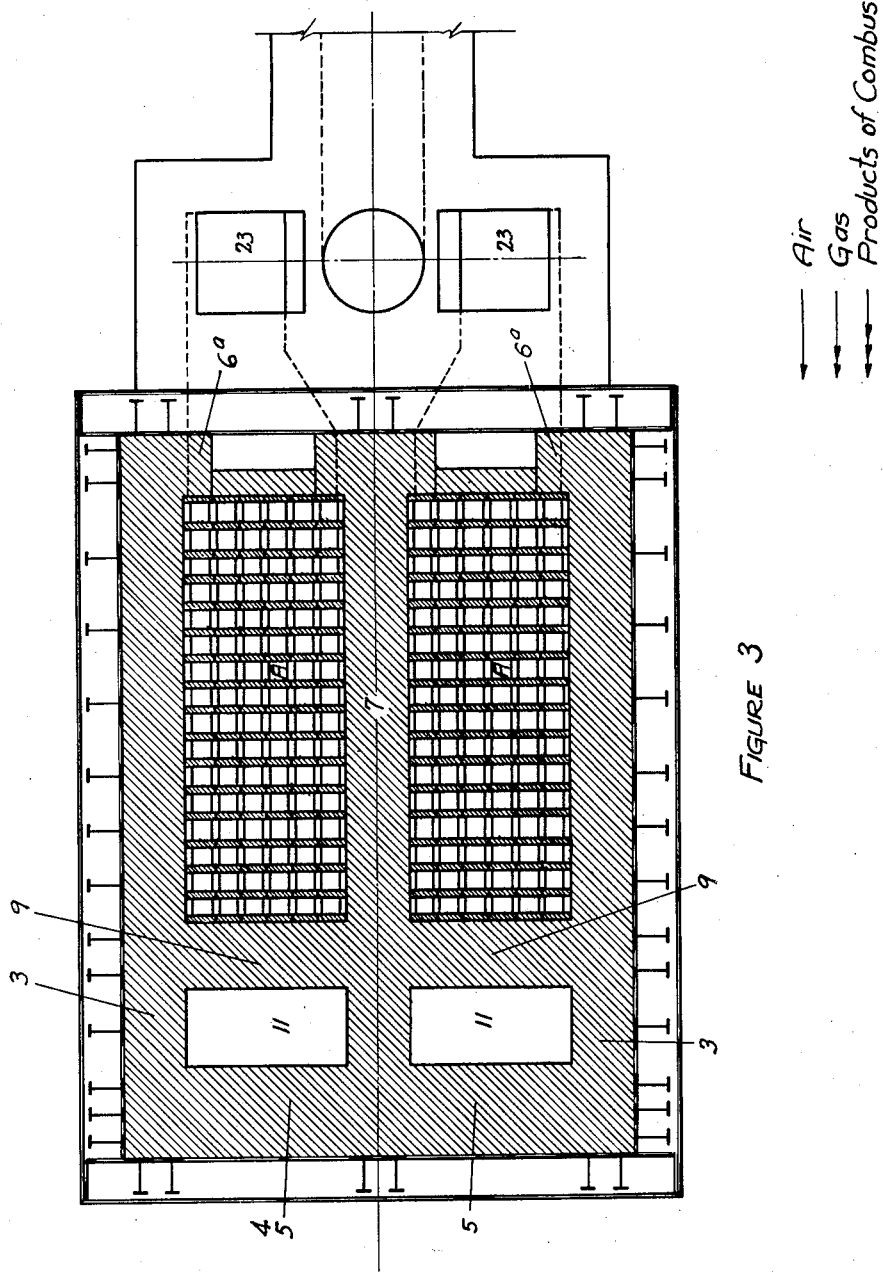
Fig. 3 is a similar section on the line III—III of Fig. 1.
Figure 4:
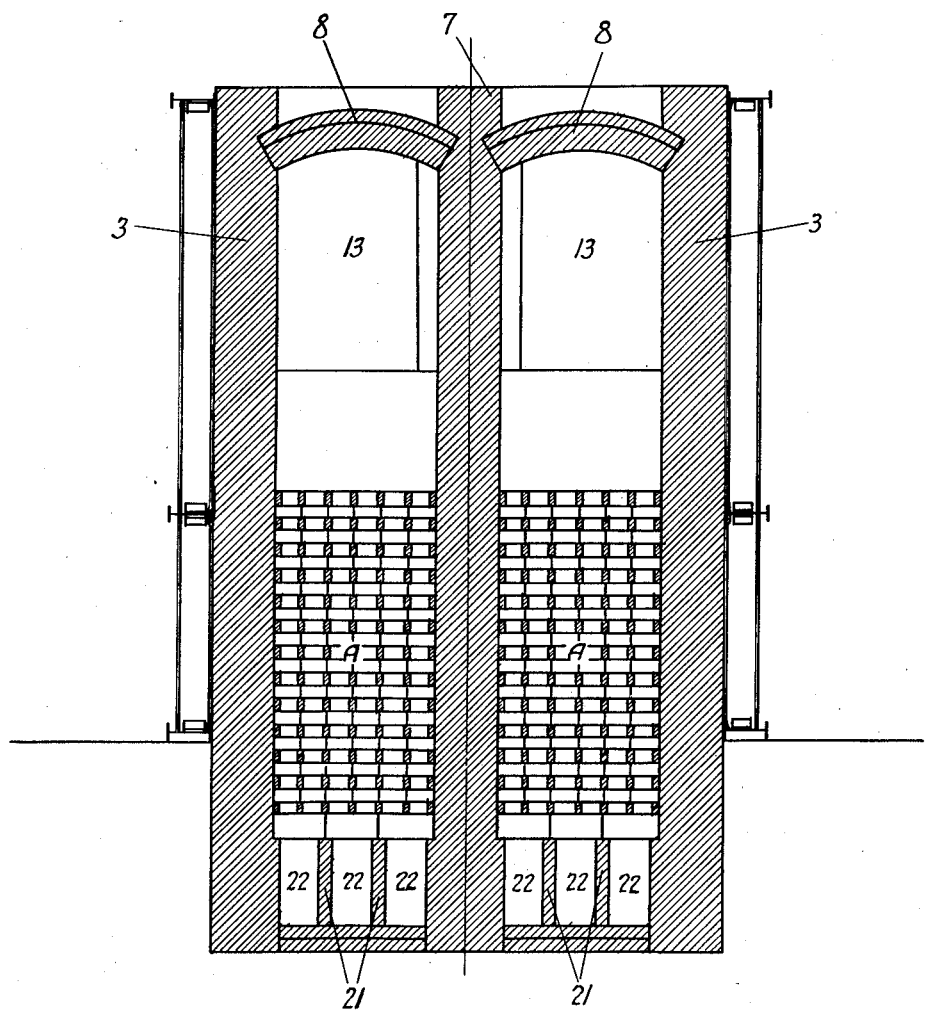
Fig. 4 is a vertical section on the line IV—IV of Fig. 1.

As will be observed, chamber 13 is of considerable depth, extending from the tops of walls 5 and 9 co-extensive and well above the normal height of ingots etc. in chamber 2. Such chamber is of substantially the same width as that of the checkerwork chambers A, leading into furnace chamber 2 at one side, with a corresponding return chamber extension or circulating channel at the opposite side, as in Fig. 2. Obviously, the circulation is reversed upon reversal of the valves according to the well known principle of operation of regenerative furnaces of the Siemens valve type.

As shown, the opposite inner surfaces of main side walls 3 are preferably continuous, avoiding any abutment or shouldered projections and facilitating circulation of the gases to and from the furnace chamber and with circulation therein, around and between the ingots.

The furnace chamber is provided with a suitable receiving and supporting floor 14 carried outwardly beyond the main wall 5 on a structural supporting platform 15, with suitable reinforcing buckstaves etc., as is usual in such construction. A removable cover 16 provided with carrying wheels 17 is adapted to be moved along a supporting trackway for opening and closing the furnace, as indicated in Fig. 1.

The checkerwork in chamber A extends upwardly above supporting walls 21 for the full length of the chamber, with intervening bottom circulation passages 22 communicating with the air supply port 23, at each side of the middle wall portion of the valve supporting structure 24, and with the reversing air circulation controlling valve C. By this arrangement the incoming air circulates vertically upward through the checkerwork A throughout its full extent.

The operation of said valve will be readily understood by those familiar with the art, supplying air alternately to one or the other of the air regenerative chambers A and with return of the waste gases from the other chamber to the outlet opening leading to the stack.

The checkerwork in chamber A is preferably arranged as shown, providing a comparatively deep body of closely assembled alternating series of vertically arranged bricks, for very complete and thorough contact therewith of the incoming air for heating.

The gas supply enters the furnace by means of a suitable pipe or pipes D introduced directly through the end wall 6 or 6b into the outer end of the mixing and combustion chamber 13 or 13b.

The gas is immediately commingled with the upwardly moving volume of highly preheated air, filling the entire chamber 13 or 13b with the combustible mixture, with initial ignition at the outer end of the chamber. The copious supply of pre-heated air, especially with a lean gas, and with ample facility for thorough mixture and preliminary combustion before entering the heating chamber 2, ensures the desirable maximum heat for action on the ingots etc. being heated.

In the construction shown in Fig. 5, the end wall 6b is extended directly upward co-extensive with the remote end of the checkerwork chamber Ab. There is thereby provided a corresponding elongation of the mixing and combustion chamber 13b with correspondingly increased capacity for preliminary mixing and combustion of gas from supply pipes Db.

If desired for preliminary heating of some of the fuel gas prior to admixture, it may be done by introducing gas by pipe or pipes Dc to a small receiving chamber 29. Such chamber is surrounded by an inner wall 30 and upper and lower walls having ports 31 and 32 communicating upwardly with the main checkerwork Ab and downwardly with air inlet conduit 22 at the end next to end wall 6b. By such arrangement initial combustion at the outer end of chamber 13b is expedited, due to pre-heating of such gas supply by the checkers.

By the construction shown, we obtain the great advantage of close association of the side-by-side pairs of superimposed air heating chambers, separated only by the wall 7. The circulation from one such pair passes directly to the inner side of the heating chamber 2 and reversely from the same side directly to and through the other pair.

The soaking pit chamber 2 extends beyond the main regenerative body of the furnace and with the circulation provided is always thoroughly and evenly heated from one side or the other in a consistently uniform and highly economical manner.

With either construction, either the elongated and deep chamber 13b or the shorter deep chamber 13, the combustion of low heat value gases is greatly quickened and increased, due to the direct and ample mixing with free circulation and open combustion throughout the entire circulation, into and through the soaking pit, with return to the other side, in a generally horse shoe course.

What we claim is:

1. In a furnace, main walls enclosing a main heating chamber and side-by-side lower vertically circulating air-preheating chambers having regenerative checkerwork therein and an upper mixing portion communicating with the heating chamber, means for alternately supplying air to and withdrawing waste gases from said chambers, and means for introducing fuel gas to the lower portion of each chamber for upward circulation through the checkerwork therein.

2. In a furnace, main walls enclosing a main heating chamber and side-by-side lower vertically circulating air-preheating chambers having regenerative checkerwork therein and an upper mixing portion communicating with the heating chamber, means for alternately supplying air to and withdrawing waste gases from said chambers, an enclosed supplemental chamber in the lower portion of each checkerwork chamber communicating downwardly with the air supply and upwardly through the checkerwork, and a fuel supply pipe leading into said supplemental chamber.

3. A furnace having a main heating chamber, a middle vertical wall terminating at the inner side of the heating chamber, a pre-heating chamber at each opposite side of said wall providing an upper mixing, combustion and delivery conduit leading to the heating chamber, means for introducing fuel thereinto, air pre-heating means in the lower portion of each chamber below the fuel supply thereof, means for supplying air upwardly through the pre-heating means, and means for supplying fuel to the lower portion of the air pre-heating means for upward circulation therethrough.

4. A furnace having a main heating chamber, a middle vertical wall terminating at the inner side of the heating chamber, a pre-heating chamber at each opposite side of said wall providing an upper mixing, combustion and delivery conduit leading to the heating chamber, means for introducing fuel thereinto remote from the heating chamber, air pre-heating checkerwork in the lower portion of each chamber below the upper mixing portion thereof, means for supplying air upwardly through the pre-heating checkerwork, an enclosed chamber in the lower portion of each checkerwork chamber communicating downwardly with the air supply and upwardly through the checkerwork, and a fuel supply pipe leading into said supplemental chamber.

In testimony whereof we hereunto affix our signatures.

GEORGE NAISMITH.
DONALD M. NAISMITH.